(12) United States Patent
Abbott et al.

(10) Patent No.: US 8,172,278 B2
(45) Date of Patent: May 8, 2012

(54) THREADED COMPONENT AND DEVICE FOR CONNECTING PIPING

(75) Inventors: Sebastian Abbott, Heidelberg (DE);
Uwe Fiedler, Hockenheim (DE);
Andreas Sausner, Frankfurt (DE)

(73) Assignee: TI Automotive (Heidelberg) GmbH, Heidelberg (DE)

( * ) Notice: Subject to any disclaimer, the term of this patent is extended or adjusted under 35 U.S.C. 154(b) by 405 days.

(21) Appl. No.: 12/486,163

(22) Filed: Jun. 17, 2009

(65) Prior Publication Data

US 2009/0324363 A1    Dec. 31, 2009

(30) Foreign Application Priority Data

Jun. 17, 2008 (EP) .................................... 08010964

(51) Int. Cl.
*F16L 25/00* (2006.01)
(52) U.S. Cl. .................... 285/384; 285/422; 427/409
(58) Field of Classification Search .................. 285/384, 285/353, 422, 423, 355, 390; 427/409, 435
See application file for complete search history.

(56) References Cited

U.S. PATENT DOCUMENTS

| | | | |
|---|---|---|---|
| 2,518,468 A | 8/1950 | Harding | |
| 2,741,288 A | 4/1956 | Johnson | |
| 3,675,950 A | 7/1972 | Beene | |
| 4,206,060 A | 6/1980 | Yamomoto | |
| 4,268,544 A | 5/1981 | Wallace | |
| 4,414,247 A | 11/1983 | Hubecker | |
| 4,468,309 A * | 8/1984 | White | 285/422 |
| 4,692,988 A | 9/1987 | Shulver | |
| 4,835,819 A | 6/1989 | Duffy | |
| 5,169,182 A * | 12/1992 | Hashimoto | 285/353 |
| 5,221,170 A | 6/1993 | Duffy et al. | |
| 5,299,843 A * | 4/1994 | Weigl et al. | 285/353 |
| 5,427,698 A | 6/1995 | Hirokawa | |
| 5,730,568 A | 3/1998 | Lanham | |
| 5,924,747 A * | 7/1999 | Miyashita | 285/328 |
| 6,027,145 A | 2/2000 | Tsuru | |
| 6,050,611 A * | 4/2000 | Asada | 285/906 |
| 6,109,660 A * | 8/2000 | Akiyama et al. | 285/353 |
| 6,361,083 B1 * | 3/2002 | Riesselmann et al. | 285/355 |
| 6,527,304 B1 * | 3/2003 | Pliassounov | 285/353 |
| 6,599,071 B1 | 7/2003 | McCauley | |

(Continued)

FOREIGN PATENT DOCUMENTS

DE    2733802    2/1979
(Continued)

OTHER PUBLICATIONS

European Search Report, publication No. EP 08 01 0964.

*Primary Examiner* — David E Bochna
(74) *Attorney, Agent, or Firm* — Leydig, Voit & Mayer, Ltd.

(57) ABSTRACT

A threaded component for connecting piping employed on motor vehicles includes a thread formed thereon and at least one unthreaded, contacting surface. A first coating having a first coefficient of friction is disposed on at least a portion of the thread, and a second coating having a second coefficient of friction is disposed on at least a portion of the unthreaded, contacting surface(s) of the threaded component. The first coefficient of friction is greater than the second coefficient of friction. In an embodiment an anti-corrosion coating is provided between the coatings and the component.

44 Claims, 3 Drawing Sheets

U.S. PATENT DOCUMENTS

| | | |
|---|---|---|
| 6,659,509 B2 | 12/2003 | Goto et al. |
| 6,663,146 B1 * | 12/2003 | Sakai et al. .................... 285/353 |
| 6,729,659 B2 * | 5/2004 | Schroeder et al. ............ 285/353 |
| 6,746,057 B2 | 6/2004 | Goto et al. |
| 7,533,909 B2 * | 5/2009 | Sausner et al. ................ 285/353 |
| 7,789,433 B2 * | 9/2010 | Calnek .......................... 285/353 |
| 2003/0039527 A1 | 2/2003 | Schatz |
| 2003/0111838 A1 | 6/2003 | Goto |
| 2004/0195825 A1 | 10/2004 | Anraku |
| 2005/0087984 A1 * | 4/2005 | Weick et al. .................. 285/353 |
| 2006/0197343 A1 | 9/2006 | Imai |

FOREIGN PATENT DOCUMENTS

| | | |
|---|---|---|
| DE | 3432001 | 10/1985 |
| EP | 0 997 677 | 3/2000 |
| EP | 1 624 183 | 2/2006 |
| JP | 2005/337469 | 12/2005 |
| WO | WO 2007/063079 | 6/2007 |

* cited by examiner

THREADED COMPONENT AND DEVICE FOR CONNECTING PIPING

CROSS-REFERENCE TO RELATED APPLICATIONS

This patent application claims priority under 35 U.S.C §119(a) to a patent application filed in the European Patent Office on Jun. 17, 2008, and assigned application serial no. EP 08 010 964.8, which is incorporated herein in its entirety by reference.

BACKGROUND

Various types of threaded components and devices for connecting piping are known. In particular, threaded components configured in the form of screw fittings, with which piping, in particular, piping employed on motor vehicles, may be joined to a connector are known. Those known screw fittings are usually provided with a coating, in particular, an anticorrosion coating covering the entire fitting. The coating is applied using, for example, a dipping or spraying technique. In the case of screw-joints having those known screw fittings, undesired loosening or detachment of the screw-joint can occur, which can create problems, particularly in the case of screw fittings having a pipe attached thereto. When such screw fittings are screwed on, the pipe might become twisted, thereby creating torsional stresses on the pipe. Those torsional stresses on the pipe generate a restoring torque that might cause undesired loosening or detachment of the screw-joint.

Undesired loosening or detachment of screw-joints might also be caused by vibrations, such as those that occur, for example, in motor vehicles. Threaded components or screw fittings having adhesive coatings applied to portions of the threads holding the screw fittings in place after they have been screwed on and can, at least largely, prevent them from loosening or becoming detached, are also known. However, such adhesive coatings will usually turn out to be counterproductive whenever screw-joints later need to be intentionally loosened or detached.

BRIEF SUMMARY OF THE DISCLOSURE

The invention is based on the engineering problem of specifying a threaded component of the aforementioned type, with which undesired loosening or detachment of the associated screw-joint may be avoided in a simple, effective, and functionally secure fashion.

In one aspect, the disclosure provides a threaded component, in particular, a threaded component for connecting or joining piping employed on motor vehicles, where a thread is provided and at least one unthreaded, contacting surface is present. Portions of the thread have a first coating having a first coefficient of friction, $\mu_1$, and portions of a contacting surface have a second coating having a second coefficient of friction, $\mu_2$. In one embodiment, the first coefficient of friction, $\mu_1$, is greater than the second coefficient of friction, $\mu_2$. The systems and methods disclosed herein are applicable in cases where the first coating on the thread forms the outer surface of the threaded component in the vicinity of the thread, or is the outermost coating on the thread. The disclosure also applies in cases where the second coating is applied on at least one contacting surface forming the outer surface of the threaded component in the vicinity of the contacting surface, or is the outermost surface of the contacting surface. In one embodiment, the entire, or essentially the entire, thread is provided with the first coating. In another embodiment, the entire, or essentially the entire, contacting surface is provided with the second coating. Furthermore, in one embodiment, the first coating is other than an adhesive coating.

DETAILED DESCRIPTION

The disclosure relates to a threaded component, in particular, a threaded component for connecting or joining piping, such as piping employed on motor vehicles, having threaded portions and at least one unthreaded, contacting surface. The disclosure also relates to a device for connecting piping, in particular, piping employed on motor vehicles, having such a threaded component.

Figure 1:
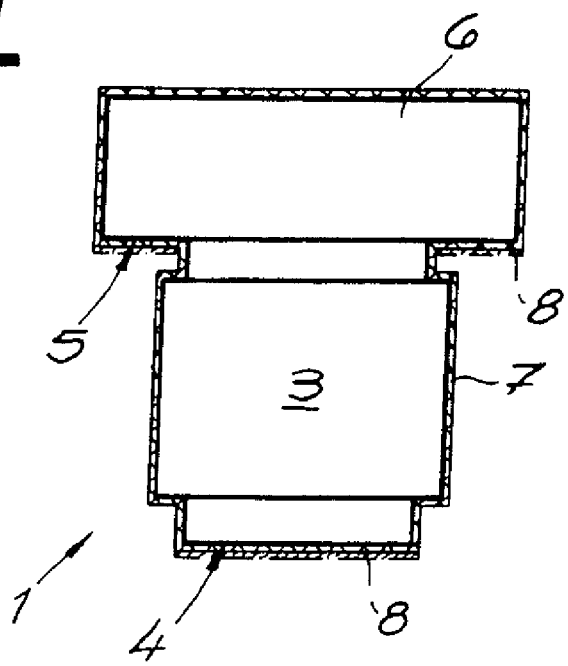
FIG. 1a view of a threaded component according to the disclosure, configured in the form of a screw fitting.
Figure 2:
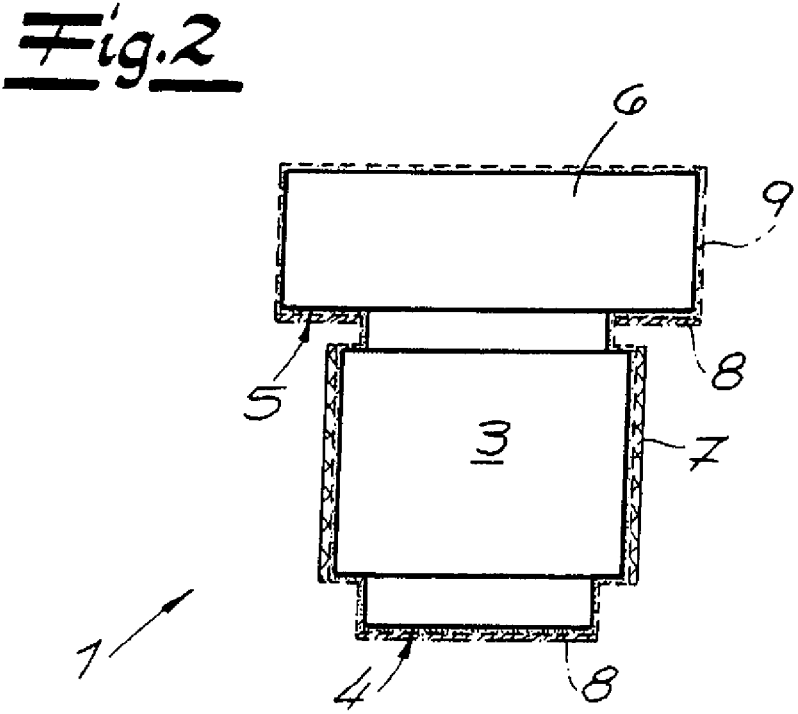
FIG. 2 illustrates an alternative embodiment of the component shown in FIG. 1.
Figure 3:
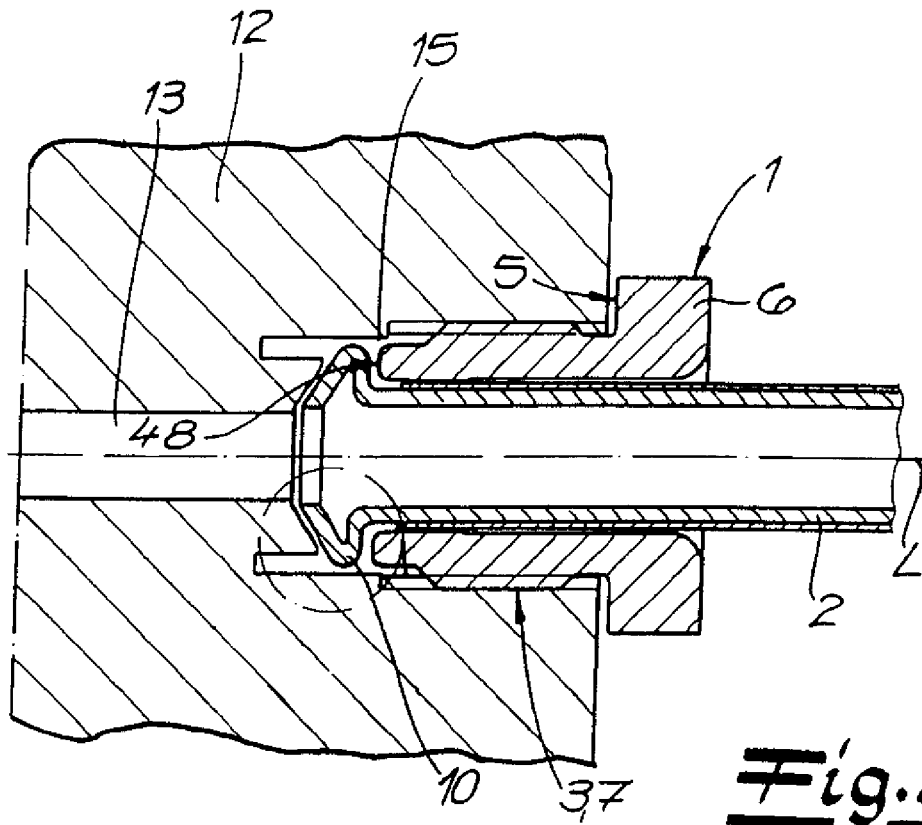
FIG. 3 is a view of a first embodiment of a device for connecting piping in accordance with the disclosure.
Figure 3A:
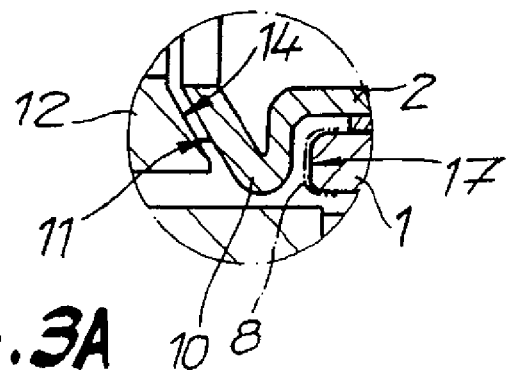
FIG. 3A is a detail view thereof.
Figure 4:
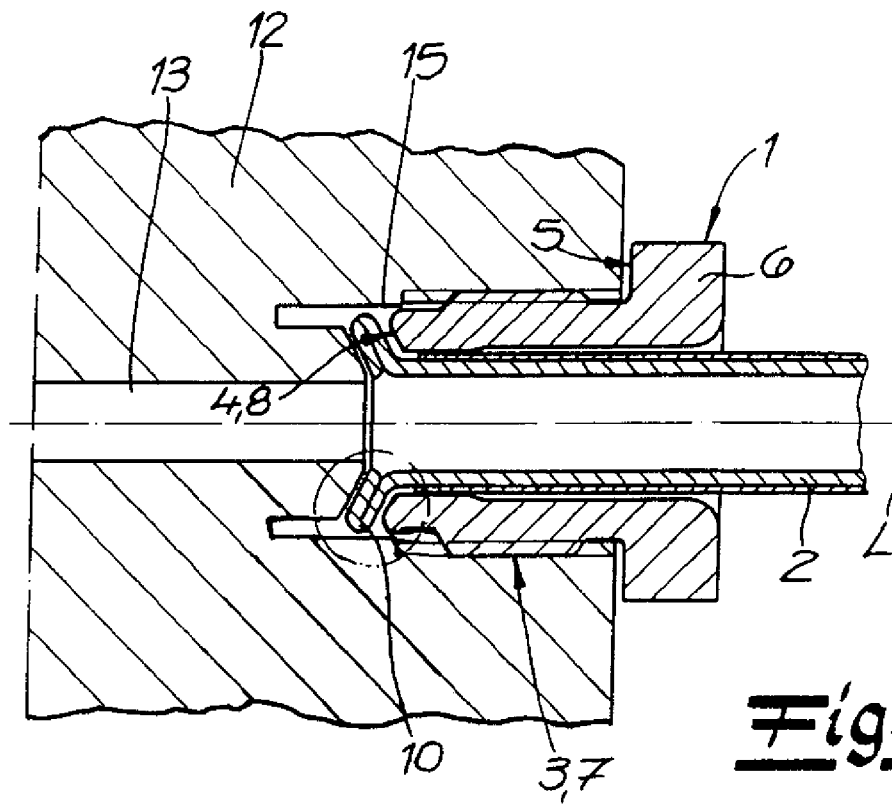
FIG. 4 is an alternative embodiment of the device shown in FIG. 3.
Figure 4A:
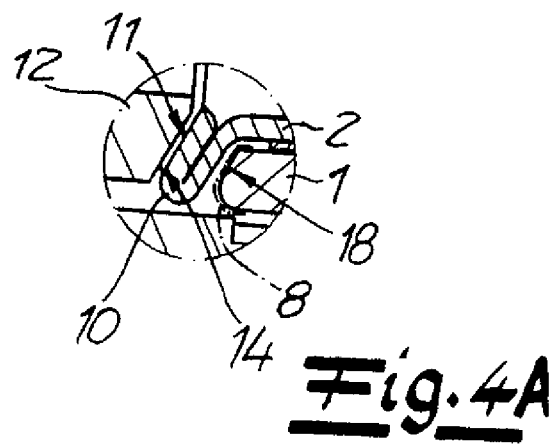
FIG. 4a is a detail view thereof.

FIG. 1 and FIG. 2 are section views of two alternate embodiments for a threaded component configured in the form of a screw fitting 1 for connecting a pipe 2 (shown in FIGS. 3 and 4) to an interconnecting block 12 (also shown in FIGS. 3 and 4). The pipe 2 may be a pipe employed on a motor vehicle, for example, in a fuel or brake system.

The screw fitting 1 includes a thread 3 and unthreaded, contacting surfaces 4, 5. One unthreaded, contacting surface 4 is arranged on the end of the screw fitting 1, and the other unthreaded, contacting surface 5 is arranged on the underside of a head 6 portion, which in the illustrated embodiment is disposed at a side thereof facing the thread 3. In one embodiment, the thread 3 is formed externally to the screw fitting 1. The threaded component according to the invention is characterized by the fact that the first coating having the first coefficient of friction, $\mu_1$, is applied to both the thread and the at least one unthreaded, contacting surface, and the second coating having the second coefficient of friction, $\mu_2$, is applied to the at least one unthreaded, contacting surface, where it covers up the first coating. The entire threaded component, or at least its thread and unthreaded, contacting surfaces, is therefore initially provided with the first coating, and the second coating is then applied to the first coating in the vicinity of its unthreaded, contacting surface, or in the vicinities of its unthreaded, contacting surfaces, in order that the second coating will form the outer surface of its unthreaded, contacting surfaces. In the case of that embodiment, the first coating is beneficially applied using a dipping technique 1. The second coating may be applied in conjunction with a spraying technique. As shown in FIG. 1, the first coating 7 entirely covers the fitting 1, including thread 3 and has a coefficient of friction, $\mu_1$. The surfaces of the unthreaded, contacting surfaces 4, 5 are provided with a second coating 8 having a coefficient of friction, $\mu_2$, which is lower than the coefficient of friction $\mu_1$. In one embodiment, the first coefficient of friction, $\mu_1$, is between two to five times greater than the second coefficient of friction, $\mu_2$.

When manufacturing the screw fitting 1, the first coating 7 having the first coefficient of friction, $\mu_1$, may be initially applied to the entire surface of the screw fitting 1, as well as to the unthreaded, contacting surfaces 4, 5, by, for example, use of a dipping application method, as is illustrated in the embodiment of FIG. 1. The first coating 7 may be an anticorrosion coating containing aluminum, to which at least one lubricant that affects the coefficient of friction of the first coating 7 has been added. The coefficient of friction, $\mu_1$, of the first coating 7 may fall within the range 0.20-0.45 or 0.33-0.37, and in the illustrated embodiment is equal to about 0.35.

In the illustrated embodiment, the second coating 8 having the second, lower, coefficient of friction, $\mu_2$, is applied exclusively to the unthreaded, contacting surfaces 4, 5 in a second application process, as shown in FIG. 1. It is noted that in the embodiment of FIG. 1, the second coating 8 is applied over a layer of the first coating 7 previously applied to the entire screw fitting 1.

The second coating 8 may be applied in conjunction with a spraying technique. The coefficient of friction of the second coating 8 might fall within the range 0.03-0.07, and equals, in the illustrated embodiment, about 0.05. In one embodiment, the second coating may include at least one lubricant that reduces its coefficient of friction. Suitable lubricants include polytetrafluoroethylene (PTFE), molybdenum disulphide (MoS2), and others. The second coating may contain both PTFE and MoS2.

In the embodiment shown in FIG. 2, an anticorrosion coating 9 is applied to the entire surface of the screw fitting 1. The anticorrosion coating 9 may advantageously be a zinc-nickel, anticorrosion coating, which may be applied by an electrolytic process. The film thickness of that anticorrosion coating may generally fall within the range 4 μm-12 μm, particularly within the range 6 μm-10 μm, and in the disclosed embodiment may be about 8 μm.

In a second step, the first coating 7 having the first, higher, coefficient of friction, $\mu_1$, is applied to the anticorrosion coating 9 over the thread 3. Following such applications, the first coating 7 forms the outer surface of the screw fitting 1 in the vicinity of the thread 3. In a third, subsequent step, the second coating 8 having the second, lower, coefficient of friction, $\mu_2$, is applied to the anticorrosion coating 9, over the unthreaded, contacting surfaces 4, 5. Following such application, the second coating 8 forms the outer surface of the screw fitting 1 covering the unthreaded, contacting surfaces 4, 5. FIGS. 3 and 4 depict a screw fitting 1 according to the disclosure in the fully assembled state, which may alternatively be described as a device for connecting piping having a screw fitting 1.

The threaded component is a screw fitting having an axial bore, through which the pipe passes, where the end of the pipe is flared and the screw fitting's end, which is provided with the second coating, abuts against the underside of its flare. The underside of the flare on the pipe's end is provided with the second coating, and the screw fitting's thread is provided with the first coating. It will be beneficial if at least some sections of the screw fitting's end accurately mate to the underside of the flare. According to an embodiment of the invention, the flare on the pipe's end is a F-flare whose underside in arranged orthogonal to, or essentially orthogonal to, the pipe's longitudinal axis and at least one section of the screw fitting's end that accurately mates to the underside of the flare is arranged orthogonal to, or essentially orthogonal to, the pipe's longitudinal axis. It will be beneficial if that section extends around the screw fitting's circumference.

According to another embodiment of the invention, the flare on the pipe's end is an E-flare whose underside is conical, or essentially conical, and the surface of the screw fitting's end has at least one conical, or essentially conical, section that abuts against the underside of the flare and accurately mates thereto. It will be beneficial if that section of its surface extends around the screw fitting's circumference. The flare on the pipe's end may, in general, be shaped differently than what is shown. In any event, it will be preferable if at least some sections of the screw fitting's end abut against the underside of the flare on the pipe's end and accurately mate thereto. The screw fitting's end abuts against, and accurately mates to, the underside of the flare all around the screw fitting's circumference.

In another embodiment, the threaded component is a nut having an axial bore, through which the pipe passes. When the end of the pipe is flared, the nut is provided with the second coating and has an internal, contacting flange that abuts the underside of the pipe's flare. The contacting flange may generally abut against at least some sections of the underside of the pipe's flare, and, in one embodiment, abuts against the entire circumference of the flare.

According to a variation on that embodiment, the flare is an F-flare whose underside is orthogonal to, or essentially orthogonal to, the pipe's longitudinal axis and the contacting flange on the nut has at least one section on its surface that is orthogonal to, or essentially orthogonal to, the pipe's longitudinal axis that abuts against the flare's underside and accurately mates thereto. According to another variation on that embodiment, the flare is an F-flare whose underside is conical, or essentially conical, and the surface of the nut's contacting flange has at least one conical, or essentially conical, section that abuts against the flare's underside and accurately mates thereto. The invention covers cases where the nut has an internal thread for accepting a connector and its internal thread is provided with the first coating.

Referring to FIG. 3, a pipe 2 passes through the screw fitting 1 in the axial direction. The end of the pipe 2 has a component that, in the case of the sample embodiment shown, is configured in the form of a flare 10. Cases where the flare is a metallic flare 10 that may be monolithically formed onto the pipe's end are contemplated. In the case of the sample embodiment shown in FIGS. 3 and 4, the screw fitting 1 is screwed into an interconnecting component configured in the form of an interconnecting block 12 having an integral, second, pipe 13. The sealing surface 11 on the end of flare 10 presses against a mating surface 14 on the interconnecting block 12. The screw fitting 1 and its thread 3, which is an external thread as shown, is threadably engaged into a threaded opening 15 formed in the interconnecting block 12. The threaded opening 15 has an internal thread matingly engaging the screw fitting 1. The thread 3 on the screw fitting 1 is provided with the first coating 7. The unthreaded, contacting surface 4 on the end of the screw fitting 1 has the second coating 8 applied to it.

On the embodiment shown in FIG. 3, the flare 10 on the pipe's end is an F-flare whose underside is arranged orthogonal to, or transversely to, the pipe's longitudinal axis, L. The end of the screw fitting 1 provided with the second coating 8 has a mating section 17 on its surface that is arranged orthogonal to the pipe's longitudinal axis, L, and matingly abuts the underside of the F-flare.

On the sample embodiment shown in FIG. 4, the flare 10 on the pipe's end is an E-flare whose underside is conical. The end of the associated screw fitting 1 has a conical section 18 on its surface that abuts against the underside of the E-flare, and accurately mates thereto. The second coating 8 is provided on the conical section 18 that abuts against the underside of the E-flare.

In a general aspect, the disclosure provides a threaded component. The threaded component may be a threaded bolt or screw fitting having an external thread, in which case, at least one section of that external thread on the threaded bolt or screw fitting is provided with the first coating. In one embodiment, the threaded component is a screw fitting, to which a pipe is attached. A pipe passing through the fitting along the axial direction forms a flared end that overlaps with the end of the screw fitting. At least one unthreaded, contacting surface, or unthreaded, contacting surfaces, on the threaded component may be arranged orthogonal to, or transversely to, or essentially orthogonal to, or essentially transversely to, the longitudinal axis of the fitting, about which the threaded component is screwed while being installed. In one embodiment, the end of the threaded bolt or screw fitting has an unthreaded, contacting surface. Portions of the unthreaded, contacting surface are coated with the second coating having the second coefficient of friction, $\mu 2$. The entire unthreaded, contacting surface of the threaded bolt or screw fitting may optionally be coated with the second coating.

In another general aspect, the disclosure provides a threaded bolt or screw fitting having a head. An underside of the head facing the thread may have an unthreaded, contacting surface. In one embodiment, portions of the unthreaded, contacting surface are coated with the second coating having the second coefficient of friction, $\mu_2$, and in an alternate embodiment the entire unthreaded, contacting surface at the underside of the head may be coated with the second coating.

In one embodiment, the threaded component in accordance with the present disclosure is a nut having an internal thread, such as the internal thread formed in the threaded opening 15 formed in the component 12 as shown in FIG. 3 and FIG. 4. At least a portion of the internal thread, and optionally the entire internal thread, is coated with the first coating. The nut is adapted to accept a threaded bolt or screw fitting having coatings over portions thereof as previously described. It is contemplated that the nut, as disclosed herein, may be either a ferrule having an internal thread for joining two pipes or a blind hole in an interconnecting block having an internal thread for connecting a pipe to be connected to the latter. In either case, the nut may include a contacting flange. At least a portion of the unthreaded, contacting surface or flange of the nut may be coated with the second coating. In one embodiment, both a threaded bolt or screw fitting and a nut mating to the threaded bolt are coated according to the disclosure such that threaded portions thereof are coated with the first coating, and unthreaded, contacting surfaces thereof are coated with the second coating.

In one alternate embodiment, the first coating having the first coefficient of friction, $\mu 1$, is applied exclusively to at least portions of the thread of a screw fitting, and the second coating having the second coefficient of friction, $\mu_2$, is applied exclusively to at least one unthreaded, contacting surface. In the case of that embodiment, the first coating is therefore applied exclusively to its thread, and not to the at least one unthreaded, contacting surface, and the second coating is applied to its at least one unthreaded, contacting surface, without inserting an intervening, first coating. In the case of that embodiment, the first and second coatings may, for example, both be applied in conjunction with a spraying technique.

In yet another general aspect, it is contemplated that the coefficient of friction, $\mu_1$, of the first coating to generally be within the range 0.15-0.5. More particularly, the coefficient of friction, $\mu_1$, may advantageously be about 0.35. The second coating's coefficient of friction, $\mu_2$, is contemplated to generally fall within the range 0.02-0.2, more particularly within the range of 0.02-0.15, and to be within the range of 0.03-0.1 in the illustrated embodiments. The second coefficient of friction may advantageously be about 0.05.

Moreover, the film thickness of the first coating may be selected to be within the range of 2 μm-25 μm, and more specifically within the range of 3 μm-20 μm for most applications, for example, 15 μm. Similarly, the film thickness of the second coating may generally be selected to be within the range of 5 μm 25 μm, and more specifically within the range of 5 μm-20 μm for most applications, for example 10 μm.

In another general aspect, the disclosure provides a device for connecting piping, in particular, piping employed on motor vehicles. The device for connecting piping has a threaded component. A pipe is attached to the threaded component. The threaded component, along with its attached pipe, may be connected onto or into a connector by threadable engagement. In one embodiment, the threaded component is a threaded bolt or a screw fitting having a pipe attached thereto. The connector may be a ferrule having a second pipe attached thereto. The screw-joint may be used to connect a pair of pipes, in particular, pipes employed on motor vehicles. Alternatively, the connector may also be a blind hole in an interconnecting block, into which the threaded bolt or screw fitting, along with its attached pipe, may be threadably attached.

In yet another general aspect, the disclosure provides a method for controlling the torque required to install a fitting. In one embodiment, the threaded component is a screw fitting and that the end thereof abuts against the underside of the flare on the pipe's end while the device for connecting piping is in the fully assembled state. When the screw fitting is tightened down, it exerts an axial, compressive force, Fax, on the flare's underside and transmits a torque, M, thereto, and thus to the pipe as well. That torque is measurable. The second coating on the screw fitting's end reduces the torque transmitted to the pipe. In one embodiment, torque ranging from 0.2 N-m (Newton-meters) to 2.5 N-m, may be transmitted for an axial force of Fax=11 kN (kilo Newtons), when the second coating is present on the screw fitting's end. Without that second coating on the screw fitting's end, torques exceeding 3 N-m, or greatly in excess of 3 N-m, would be transmitted for an axial force of Fax=11 kN. It can be appreciated that the transmitted torque will increase as the area of the surface, over which the screw fitting and flare are in contact with one another, increases. The values stated above are particularly applicable to metallic screw fittings and metallic flares coated in accordance with the disclosure, particularly in the case of screw fittings with thread diameters falling within the range 8 mm-16 mm, and more particularly thread diameters falling within the range 10 mm-14 mm. The diameters of the mating flares involved roughly equal the associated thread diameters.

The first coating may contain at least one lubricant affecting its coefficient of friction. The second coating having the second, lower, coefficient of friction, $\mu_2$, is applied to the unthreaded, contacting surfaces, namely, to the screw fitting's end and the underside of the screw fitting's head, following the application of the first coating. The second coating may contain polytetrafluoroethylene (PTFE) and molybdenum disulphide (MoS2) in order to reduce its coefficient of friction. The film thickness of the second coating may generally fall within the range 10 μm-20 μm, and in the illustrated embodiment may be about 15 μm. In the second sample embodiment, the aforementioned second coating might also be selectively applied first and the aforementioned first coating selectively applied thereafter.

The disclosure is based on the recognition that, due to the advice according to the disclosure, or to the coating of the threaded component in accordance with the disclosure, unintentional loosening or detachment of the associated screw joint may be prevented in a simple, effective, and functionally secure manner. Thanks to the application of various coatings in accordance with the disclosure, the engineering problem addressed by the invention may be solved in an amazingly effective manner. The disclosure is thus based on the recognition that the coating having the higher coefficient of friction applied to the vicinity of the thread effectively makes unintentional loosening of the screw joint less likely. However, the coating having the lower coefficient of friction applied to the vicinities of the contacting surfaces reduces the torsional stresses transmitted to, or precludes their being transmitted to, the components to be joined, or to the ends of piping, which will greatly reduce, or even eliminate, the aforementioned restoring torques. Application of the coatings to be selectively applied to various sections of the threaded component may be accomplished in simple and precise manners, which implies that the disclosed objectives may be readily attained. Threaded components according to the disclosure are particularly suitable for joining piping, in particular, piping employed on motor vehicles, where "piping employed on motor vehicles" largely means fuel lines or brake lines.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. T Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A threaded component for connecting piping employed on motor vehicles, comprising:
   a thread formed on said threaded component;
   at least one unthreaded, contacting surface formed on said threaded component;
   first coating having a first coefficient of friction disposed on at least a portion of said thread;
   a second coating having a second coefficient of friction disposed on at least a portion of said at least one unthreaded, contacting surface;
   wherein said first coefficient of friction is greater than said second coefficient of friction and the first coefficient of friction falls within the range 0.15-0.5.

2. The threaded component as set forth in claim 1, wherein said threaded component is at least one of a threaded bolt and a screw fining, and wherein said thread is an external thread.

3. The threaded component as set forth in claim 2, wherein said unthreaded, contacting surface is formed at an end of said threaded component.

4. The threaded component as set forth in claim 2, further including a head formed on said threaded component and disposed adjacent to said thread, wherein said head defines an underside facing said thread, the underside having an additional unthreaded, contacting surface, wherein said additional unthreaded, contacting surface is at least partially coated by said second coating.

5. The threaded component as set forth in claim 1, wherein said first coefficient of friction is at least twice the second coefficient of friction.

6. The threaded component as set forth in claim 5, wherein said first coefficient of friction is at least three times the second coefficient of friction.

7. The threaded component as set forth in claim 5, wherein said first coefficient of friction is at least four times the second coefficient of friction.

8. The threaded component as set forth in claim 1, wherein the second coefficient of friction falls within the range 0.02-0.2.

9. The threaded component as set forth in claim 1, wherein the second coefficient of friction fails within the range 0.03-0.1.

10. The threaded component as set forth in claim 1, wherein a first coating film thickness of said first coating falls within the range 2 µm-25 µm.

11. The threaded component as set forth in claim 1, wherein a first coating film thickness of said first coating hills within the range 3 µm-20 µm.

12. The threaded component as set forth in claim 1, wherein a second film thickness of said second coating falls within the range 5 µm-25 µm.

13. The threaded component as set forth in claim 1, wherein a second film thickness of said second coating falls within the range 5 µm-20 µm.

14. A threaded component as claimed in claim 1 wherein said component includes an anti-corrosion coating thereon.

15. A threaded component as claimed in claim 14 wherein said anti-corrosion coating is disposed between said thread and said first coating and said contacting surface and said second coating.

16. A threaded component as claimed in claim 14 wherein said anti-corrosion coating is a zinc-nickel coating.

17. A device for connecting piping employed on motor vehicles, comprising:
    a connector;
    a pipe; and
    a threaded component connected to said pipe and threadably connected to said connector, said threaded component comprising:
       a thread formed on said threaded component;
       at least one unthreaded, contacting surface formed on said threaded component;
       a first coating having a first coefficient of friction disposed on at least a portion of said thread;
       a second coating having a second coefficient of friction disposed on at least a portion of said at least one unthreaded, contacting surface;
    wherein said first coefficient of friction is greater than said second coefficient of friction.

18. The device as set forth in claim 17, wherein said threaded component is at least one of a threaded holt and a screw fitting, and wherein said thread is an external thread.

19. The device as set forth in claim 18, wherein said unthreaded, contacting surface is formed at an end of said threaded component.

20. The device as set forth in claim 17, further including a head formed on said threaded component and disposed adjacent to said thread, wherein said head defines an underside facing said thread, the underside having an additional unthreaded, contacting surface, wherein said additional unthreaded, contacting surface is at least partially coated by said second coating.

21. The device as set forth in claim 20, wherein said threaded component is a screw fitting having an axial bore, wherein said pipe passes through said axial bore, wherein an end of the pipe forms a flare, and wherein said end of said screw fitting abuts an underside of said flare.

22. The device as set forth in claim 21, wherein said end of said screw fitting abutting said flare is at least partially covered by said second coating.

23. The device as set forth in claim 21, wherein said flare is an F-flare defining an underside disposed generally orthogonal with respect to a longitudinal axis of said pipe, and wherein said screw fitting forms an end surface disposed generally orthogonal to said longitudinal axis of said pipe and matingly abutting said underside of said flare.

24. The device as set forth in claim 21, wherein said flare is an E-flare defining an underside having a generally conical shape, and wherein said screw fitting forms an end surface having a generally conical section and matingly abutting said underside of said flare.

25. The device as set forth in claim 21, wherein said flare is an F-flare, wherein said underside is disposed generally orthogonal with respect to a longitudinal axis of said pipe, and wherein said contacting flange is disposed generally orthogonally relative to said longitudinal axis of said pipe and matingly abuts said underside of said flare.

26. The device as set forth in claim 21, wherein said flare is an E-flare, wherein said underside has a generally conical shape, and wherein contacting flange has a generally conical section matingly abutting said underside of said flare.

27. The device as set forth in claim 17, wherein said first coefficient of friction is at least twice the second coefficient of friction.

28. The device as set forth in claim 27, wherein said first coefficient of friction is at least three times the second coefficient of friction.

29. The device as set forth in claim 28, wherein said first coefficient of friction is at least four times the second coefficient of friction.

30. The device as set forth in claim 17, wherein the first coefficient of friction falls within the range 0.15-0.5.

31. The device as set forth in claim 17, wherein the first coefficient of friction falls within the range 0.25-0.4.

32. The device as set forth in claim 17, wherein the second coefficient of friction falls within the range 0.02-0.2.

33. The device as set forth in claim 17, wherein the second coefficient of friction fails within the range 0.03-0.1.

34. The device as set forth in claim 17, wherein a first coating film thickness of said first coating falls within the range 2 μm-25 μm.

35. The device as set forth in claim 17, wherein a first coating film thickness of said first coating falls within the range 3 μm-20 μm.

36. The device as set forth in claim 17, wherein a second filet thickness of said second coating falls within the range 5 μm-25 μm.

37. The device as set forth in claim 17, wherein a second film thickness of said second coating falls within the range 5 μm-20 μm.

38. The device as set forth in claim 17, wherein said threaded component is a nut having an axial bore and defining an internal, contacting flange, wherein said pipe passes through said axial bore, wherein an end of the pipe forms a flare having an underside, and wherein said underside of said flare abuts against said contacting flange.

39. The device as set forth in claim 38, wherein said contacting flange is at least partially coated by said second coating.

40. A threaded component as claimed in claim 17 wherein said component includes an anti-corrosion coating thereon.

41. A threaded component as claimed in claim 40 wherein said anti-corrosion coating is disposed between said thread and said first coating and said contacting surface and said second coating.

42. A threaded component as claimed in claim 40 wherein said anti-corrosion coating is a zinc-nickel coating.

43. A threaded component for connecting piping employed on motor vehicles, comprising:
 a thread formed on said threaded component;
 at least one unthreaded, contacting surface formed on said threaded component;
 a first coating having a first coefficient of friction disposed on least a portion of said thread;
 a second coating having a second coefficient of friction disposed on at least a portion of said at least one unthreaded, contacting surface;
 wherein said first coefficient of friction is greater than said second coefficient of friction and wherein the first coefficient of friction falls within the range 0.25-0.4.

44. A method for installing a fitting, comprising:
 installing a screw fitting having a pipe passing through an opening formed in the screw fitting into a threaded opening, wherein the pipe forms a flare at an end thereof, and wherein the screw fitting has an end surface disposed adjacent to the flare;
 applying a torque to the screw fitting, thus causing the end surface of the screw fitting to abut an underside of the flare
 exerting an axial, compressive force on the underside of the flare;
 transmitting a torque to the underside of the flare;
 retaining the torque applied to the screw fitting by providing a first coating covering at least a portion of a threaded section of the screw fining; and
 reducing the torque transmitted to the underside of the flare by providing a second coating covering at least a portion of the end surface of the screw fitting abutting the underside of the flare.

* * * * *

UNITED STATES PATENT AND TRADEMARK OFFICE
CERTIFICATE OF CORRECTION

| | | |
|---|---|---|
| PATENT NO. | : 8,172,278 B2 | Page 1 of 1 |
| APPLICATION NO. | : 12/486163 | |
| DATED | : May 8, 2012 | |
| INVENTOR(S) | : Sebastian Abbott, Uwe Fiedler and Andreas Sausner | |

It is certified that error appears in the above-identified patent and that said Letters Patent is hereby corrected as shown below:

Claim 1,
Col. 7, Line 50, before "first", insert -- a --

Claim 2,
Col. 7, Line 60, change "fining" to "fitting"

Claim 9,
Col. 8, Line 18, change "fails" to "falls"

Claim 11,
Col. 8, Line 24, change "hills" to "falls"

Claim 18,
Col. 8, Line 59, change "holt" to "bolt"

Claim 33,
Col. 9, Line 50, change "fails" to "falls"

Claim 36,
Col. 10, Line 2, change "filet" to "film"

Claim 44,
Col. 10, Line 45, after "flare", add -- ; --

Claim 44,
Col. 10, Line 51, change "fining" to "fitting"

Signed and Sealed this
Twenty-sixth Day of June, 2012

David J. Kappos
*Director of the United States Patent and Trademark Office*